(12) United States Patent
Okina

(10) Patent No.: US 6,341,096 B1
(45) Date of Patent: Jan. 22, 2002

(54) SEMICONDUCTOR MEMORY DEVICE

(75) Inventor: Katsumi Okina, Fuchu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/486,259

(22) PCT Filed: Jun. 25, 1999

(86) PCT No.: PCT/JP99/03419

§ 371 Date: Jun. 15, 2000

§ 102(e) Date: Jun. 15, 2000

(87) PCT Pub. No.: WO99/67788

PCT Pub. Date: Dec. 29, 1999

(30) Foreign Application Priority Data

Jun. 25, 1998 (JP) ............................................ 10-179281

(51) Int. Cl.[7] .................................................. G11C 7/00
(52) U.S. Cl. .................... 365/220; 365/221; 365/230.09
(58) Field of Search ................................. 365/220, 221, 365/233, 230.09

(56) References Cited

U.S. PATENT DOCUMENTS

| | | | | |
|---|---|---|---|---|
| 5,220,529 A | * | 6/1993 | Kohiyama et al. | 365/189.01 |
| 5,495,451 A | * | 2/1996 | Cho | 365/221 |
| 5,561,674 A | | 10/1996 | Cho | |
| 5,867,431 A | * | 2/1999 | Sato | 365/189.04 |
| 5,898,893 A | * | 4/1999 | Alfke | 365/221 |
| 5,929,933 A | * | 7/1999 | Takeuchi | 345/127 |
| 5,973,706 A | * | 10/1999 | Takeuchi | 345/515 |

FOREIGN PATENT DOCUMENTS

| | | |
|---|---|---|
| JP | 61-144122 | 7/1986 |
| JP | 1-251382 | 10/1989 |
| JP | 7-169265 | 7/1995 |
| JP | 7-326961 | 12/1995 |

* cited by examiner

Primary Examiner—Richard Elms
Assistant Examiner—Vanthu Nguyen
(74) Attorney, Agent, or Firm—Oliff & Berridge, PLC

(57) ABSTRACT

A semiconductor memory is provided which has a FIFO memory in which data is read in synchronization with a read clock signal. In order to read the memory, the device has a read controller which generates a read counter clock signal in synchronization with the read clock signal and a memory read access signal, and which generates a read counter reset signal which becomes active in synchronization with the read clock signal after the reset signal becomes active. The device also has a read counter which sequentially generates first read addresses whose address values are different in synchronization with the read clock signal and is reset when the read counter reset signal is active, and an AND gate group in which second read address signals are output and first read address signals from a read counter and the reset signal are input. The output of the AND gate group becomes the output from the read counter when the reset signal is HIGH, and during the reset when the reset signal is LOW, the read clock signal is set at a specified address 0 in non-synchronization with the read clock signal.

13 Claims, 14 Drawing Sheets

SEMICONDUCTOR MEMORY DEVICE

BACKGROUND OF THE INVENTION

1. Field of the Invention

This invention relates to a semiconductor memory device, and specifically to a semiconductor memory device which sequentially designates address values in a memory, such as a FIFO (First-In-First-Out) memory, according to an external clock, and which performs an operation of returning to a specified address during reset.

2. Description of Related Art

FIG. 15 is a block diagram of a semiconductor memory device 600 of a conventional clock-synchronized type. FIG. 15 shows a FIFO memory 601 and a circuit which designates a read address of the FIFO memory 601. In order to designate a read address of the FIFO memory 601, a read controller 602, a read counter 603, and a delay circuit 604 are provided.

A read clock signal RCK and a reset signal RRS are input to the read controller 602. The read controller 602 is synchronized with the read clock signal RCK and generates a read counter clock signal CNT and a memory read access signal CS. Furthermore, the read controller 602 detects a LOW level of the reset signal RRS and generates a read counter reset signal RS.

As the read counter 603 counts up the read counter clock signal CNT and updates address values one by one, the read counter 603 is synchronized with the read clock signal CNT and generates a read address signal An. The FIFO memory 601 is a clock-synchronized type memory which latches the address signal An at the fall of the memory read access signal CS. Additionally, the purpose for generating a memory read access signal CS', which has been delayed in the delay circuit 604, will be described later.

FIG. 16 is a timing chart relating to a reading operation of the semiconductor memory device 600.

At time t1 shown in FIG. 16, an external clock signal RCK rises. In synchronization with the rise of this external signal RCK, the memory read access signal CS falls at time t2, and the FIFO memory 601 enters into a reading state.

At this time, the read counter 603 holds "N" as the address signal An as shown in FIG. 16.

The FIFO memory 601 latches the address signal An at the fall of the memory read access signal CS at time t2. Therefore, the FIFO memory 601 can perform an N read cycle, which reads data Yn corresponding to the address signal An (address value N) which has been latched at time t2.

However, actually, the memory read access signal CS' is generated, which is delayed from the memory read access signal CS by the time interval tdly of FIG. 16 in the delay circuit 604, and the address signal An is latched at the fall of the signal CS'. Because of this, data Yn is read from the FIFO memory 601 after passage of a specified access time interval tacs from the starting time t1 of the N read cycle. This access time interval tacs will be discussed later.

When the external clock signal RCK falls at time t3 after the data Yn is read, the counter clock signal CNT falls at time t4, and the memory read access signals CS and CS' rise. The memory access is completed as the memory read access signals CS, CS' rise. Meanwhile, the read counter 603 counts up at the fall of the counter clock signal CNT, outputs the value N+1 as the address signal An, which is the output, and prepares for the following read cycle.

Here, in FIG. 16, after the external clock signal RCK falls at time t3, the reset signal RRS changes to LOW at time t5 before the following rising time t6.

In the reset cycle in which the reset signal RRS becomes LOW, the FIFO memory 601 needs to implement a read access to the memory address 0 within the cycle.

Because of this, the counter reset signal RS falls in synchronization with the rise of the clock signal RCK at time t6 as shown in FIG. 16, and the address signal An from the read counter 603 at time t7 becomes "0".

Here, in the above-mentioned N read cycle, the timing at which the address signal An from the read counter 603 becomes "N" is synchronized with the fall of the clock signal RCK a half cycle before time t4 as shown in FIG. 16. That is, the timing at which the address signal An from the read counter 603 becomes "N" is set to be prior to entering the N read cycle.

However, in the reset cycle, the timing at which the address signal An from the read counter 603 becomes "0" is set at the starting point of the reset cycle.

In this case, when the address signal An is latched at the timing of time t7, at which time the memory read access signal CS falls, the address signal An has not yet been changed from "N" to "0". Thus, the address setup time cannot be secured, or is difficult to determine, in the reset cycle.

In order to avoid this problem, as mentioned above, the memory read access signal CS' is generated in which the memory read access signal CS is delayed by the time interval tdly of FIG. 16 in the delay circuit 604, and the address signal An is latched at the fall (time t8) of the signal CS'.

However, if the memory read access signal CS is delayed in the delay circuit 604, the address latch timing is delayed by the time interval tdly in a normal cycle, as well as in the reset cycle, and the access time interval tacs of the FIFO memory 601 has increased as shown in FIG. 16.

In particular, when the number of words of the FIFO memory 601 increases, a circuit area occupied by the read counter 603 becomes large, and the length of the wiring to implement the reset cycle becomes long. This means that the signal delay is prolonged within the read counter 603 and on the output wiring, and that the time interval during which address 0 from the read counter 603 is transmitted to the FIFO memory 601 further increases.

SUMMARY OF THE INVENTION

As a result, the above-mentioned problems significantly appear.

Therefore, an object of this invention is to provide a semiconductor memory device which secures the address setup time in the reset cycle, which shortens the memory access time in the normal cycle and in the reset cycle, and which can be operated at high speed.

Another object of this invention is to provide a semiconductor memory device which can be operated at even higher speed by making the timing at which the read address signal in the reset cycle is changed to a specified address value, such as address 0, asynchronous with the read clock signal.

A semiconductor memory device of this invention has
- a memory which reads data in synchronization with a read clock signal,
- a read controller which synchronizes with the read clock signal, generates a read counter clock signal and a memory read access signal, and generates a read counter reset signal which becomes active in synchronization with the read clock signal after the reset signal becomes active, a read counter which sequentially generates first read address signals with different address values in synchronization with the read clock signal and which is reset when the read counter reset signal is active, and a read address setting circuit which outputs second read address signals to the memory, based on at least the first read address signals from the read counter and the reset signal.

The address values of the second read address signals from the read address setting circuit are set based on the address values of the first read address signals when the reset signal is inactive, and the reset signal is set at a specified address value regardless of the logic of the first read address signals when the reset signal is active.

According to this invention, the address values of the second read address signals supplied to the memory are normally set based on the first read address signals from the read counter in a read cycle. Meanwhile, in the reset cycle, the address values of the second read address signals supplied to the memory are set in a system different from that in the read counter. Because of this, reset is activated after the counter reset signal becomes active, and a specified address value is set in the reset cycle, in which an internal delay is generated, without depending on the output of the read counter. Therefore, the timing at which a read address signal (second read address signal) is set at the specified address value in the reset cycle can be accelerated and without necessarily delaying the memory read access signal, the address setup time is secured and a high speed operation can be implemented.

In this invention, when the reset signal is active, the read address setting circuit changes the address values of the second read address signals to the specified address value in asynchronization with the read clock signal.

By so doing, the second read address signals can be set to the specified address value and high speed operation can be implemented without waiting for a change in the read clock signal after the reset signal becomes active.

In this invention, the read address setting circuit can set the specified address value of a second read address signal based on the logic of the reset signal when the reset signal is active.

As an example, when there are n output lines of the read counter, the read address setting circuit is structured by n logic gates, to which a signal from one of the n output lines and the reset signal are respectively input.

By so doing, the read address setting circuit can easily set the 0 address as the specified address value of a second read address signal when the reset signal is active. Specifically, if the reset signal is LOW active, then the n logic gates are AND gates. Furthermore, if the reset signal is HIGH active, then the n logic gates are NOR gates. Thus, the read address setting circuit is structured by one row of a logic gate group, and because there is less signal delay, it is suitable for high speed operation. Furthermore, because a NOR gate has less delay than an AND gate, it is more suitable for high speed operation.

In this invention, it is also acceptable that the read address setting circuit has an address register which stores the specified address value, and a selector which selects one of the specified address value from the address register and the first read address signals from the read address counter and outputs it as a second read address signal, based on the reset signal.

In this case as well, in the reset cycle, because the second read address signal in which the specified address value has been set is selected from the selector without synchronization to the read clock, high speed operation is possible.

In this invention, the read address setting circuit can change the address value of a second read address signal to the specified address value in synchronization with the read clock signal when the reset signal is active.

The reset is activated after the counter reset signal is active, and without depending on the output of the read counter in which an internal delay is generated, the specified address value is set in the reset cycle. Therefore, high speed operation can be implemented more than in a conventional device which depends on the output of the read counter in the reset cycle as well.

When there are n output lines of the read counter, this type of read address setting circuit can have a gate control circuit which generates a gate control signal, based on the read clock signal and the reset signal, and n logic gates, to which a signal from any one of the n output lines and the output signal from the gate control circuit are respectively input. Alternatively, the read address setting circuit has an address register which stores the specified address values, a selector control circuit which generates a selector control signal based on the read clock signal and the reset signal, and a selector which selects one of the specified address value from the address register and the first read address signals from the read address counter, based on the selector control signal, and outputs the one as a second read address signal.

Even this type of the read address setting circuit can set the 0 address as the specified address value of a second read address signal when the reset signal is active.

Furthermore, in the case of using an address register, this is excellent because an arbitrary address value including the 0 address can be set.

DETAILED DESCRIPTION OF PREFERRED EMBODIMENT

The following explains this invention in detail with reference to the drawings.

First Embodiment (Structure of Semiconductor Memory Device)

Figure 1:
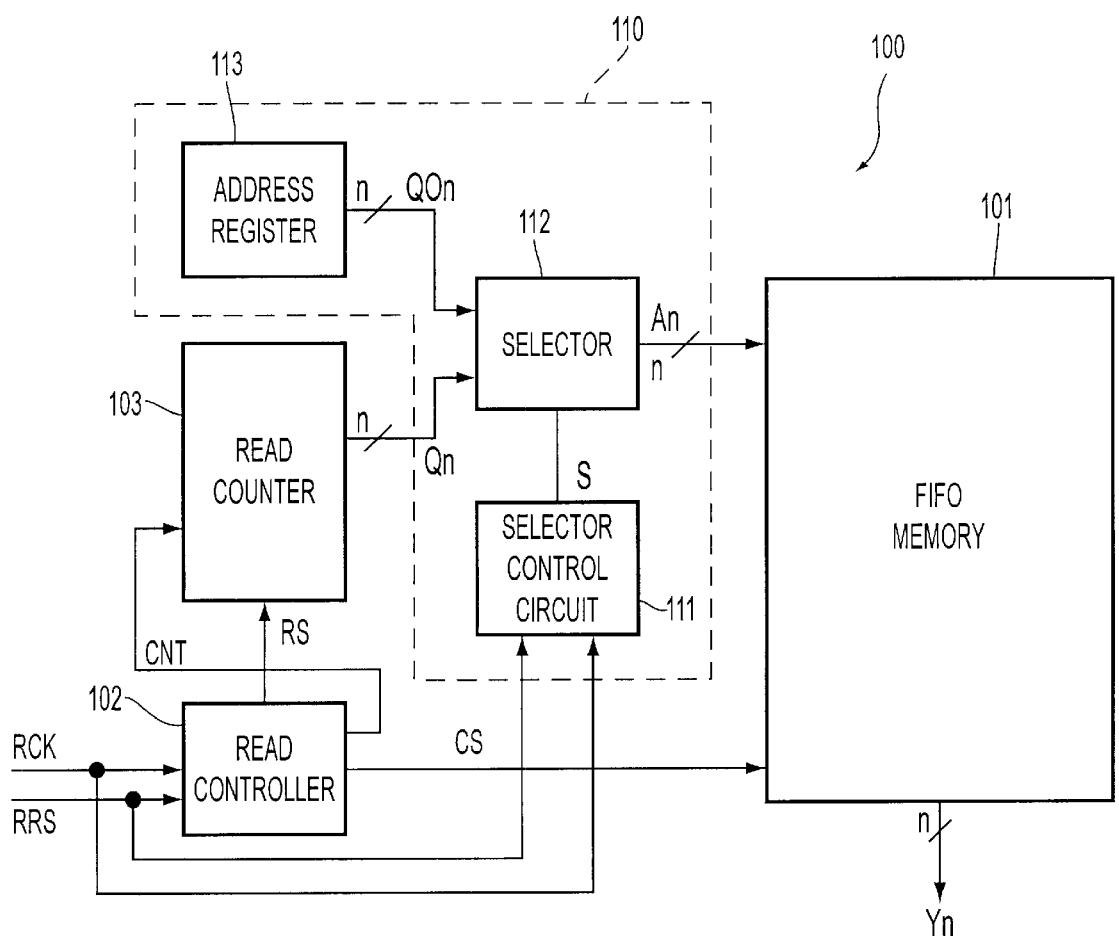
FIG. 1 is a block diagram of a semiconductor memory device related to a first embodiment of this invention.

FIG. 1 is a block diagram of a clock-synchronized type semiconductor memory device 100 related to a first embodiment of this invention. FIG. 1 shows a memory, such as a FIFO memory 101, and a circuit which designates a read address of the FIFO memory 101. This FIFO memory 101 is used as, for example, a sound recording memory of a communication device. Data can be temporarily stored and read asynchronously with a writing operation.

In order to designate the read address of the FIFO memory 101, a read controller 102, a read counter 103, and a read address setting circuit 110 are provided.

A read clock signal RCK and a reset signal RRS are input to the read controller 102 via an external CPU or the like of the semiconductor memory device 100. The read controller 102 is synchronized with the read clock signal RCK and generates a read counter clock signal CNT and a memory read access signal CS. Additionally, the read controller 102 detects the LOW level of the LOW active reset signal RRS, for example, and generates a read counter reset signal RS.

The read counter 103 counts up the read counter clock signal CNT, updates the address values one by one, and generates a first read address signal Qn in the synchronization with the read clock signal CNT.

Here, the memory capacity of the FIFO memory 101 is, for example, 1K×S bit. The number of bits S is equal to one word or the number of bits which are assigned to one pixel or the like, and, for example, is structured by 1 byte (8 bits), or 9 bits in which 1 bit of parity is added to the 8 bits. Instead of the 1 byte data, one word (16 bits) or one long word (32 bits) can be used. In any case, there are 1,000(=1K) address values of the FIFO memory 101. Because of this, the value n of the first read address signal Qn in this embodiment is n=10 as a value which satisfies $2^n \geq 1,000$. In this case, the first read address signal Qn is structured by the address values Q0–Q9, and n=10 output lines exist in the address counter 102.

The read address setting circuit 110 as shown in FIG. 1 has a selector control circuit 111, a selector 112, and an address register 113. The address register 113 stores a specified address value, for example, address 0 (Q00=Q01 =. . . =Q09 =0). The selector control circuit 111 generates a selector control signal S, based on the read clock signal RCK and the reset signal RSS. The selector 112 selects and outputs one of the outputs from the address register 113 and the read address counter 103, based on the selector control signal S from the selector control circuit 111.

Figure 2:
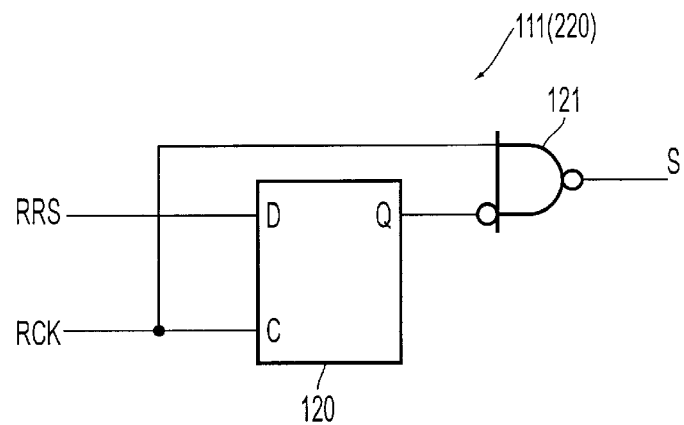
FIG. 2 is a circuit diagram of a selector control circuit as shown in FIG. 1.

Here, the selector control circuit 111 can be structured as shown in FIG. 2. In FIG. 2, the selector control circuit 111 has a D type flip flop 120 and a logic gate 121. The reset signal RRS is input to the data input terminal D of the D type flip flop 120, and the read clock signal RCK is input to the clock input terminal C. The output Q of the D type flip flop 120 and the read clock signal RCK are input to the logic gate 121, and the output becomes a selector control signal S.

Figure 3:
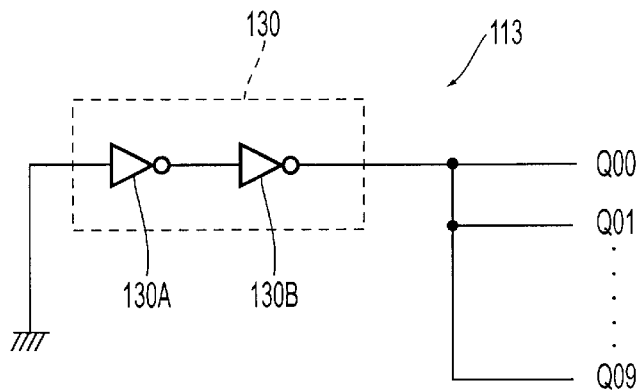
FIG. 3 is a circuit diagram in which an address register as shown in FIG. 1 is constituted by a pull-down type.
Figure 4:
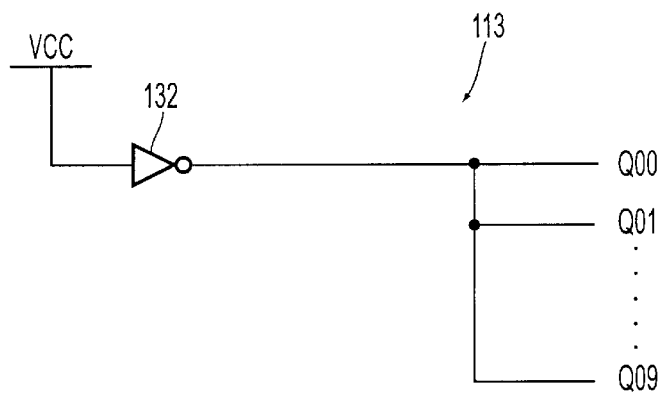
FIG. 4 is a circuit diagram in which the address register as shown in FIG. 1 is constituted by a pull-up type.

One of the structures shown in FIGS. 3 and 4 can be used for a structure by which the address register 113 sets address 0. FIG. 3 shows an address register 113 of a pull-down structure, and the output lines of outputs Q00–Q09 are grounded via a buffer 130 formed of two inverters 130A, 130B which are connected in series. FIG. 4 shows an address register 113 of a pull-up structure. The output lines of outputs Q00–Q09 are connected to power source electric potential VCC via an inverter 132. In any event, the logic of outputs Q00–Q09 is LOW (0).

Figure 5:
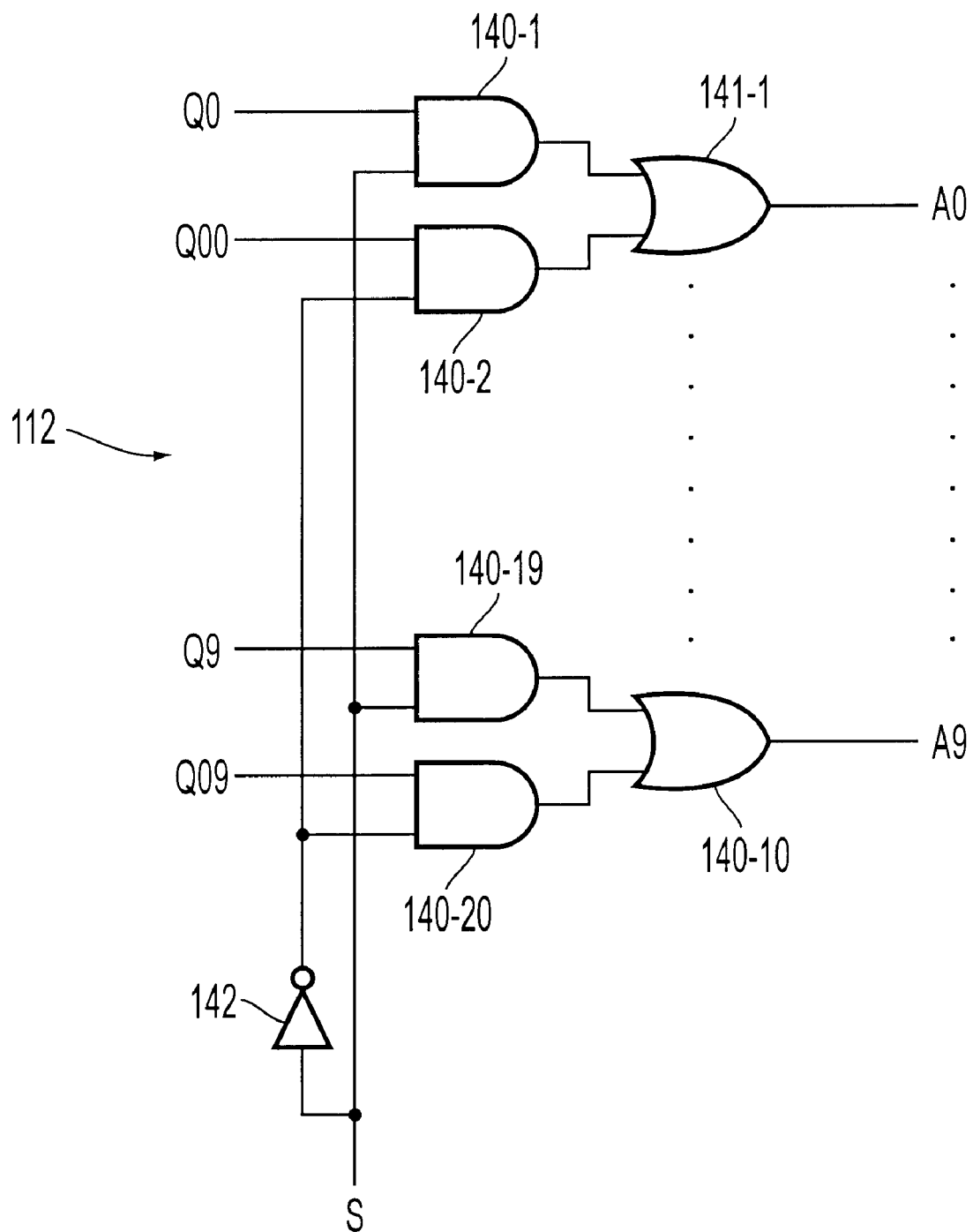
FIG. 5 is a circuit diagram of the selector shown in FIG. 1.

The selector 112 shown in FIG. 1 can be structured as shown in FIG. 5. As shown in FIG. 5, the selector 112 is constituted by a first row of twenty AND gates 140-1 to 140-20 and a second row often OR gates 141-1 to 141-10. One of the outputs Q0–Q9 of the read counter 103 and the selector control signal S are input to the ten odd numbered ones of the AND gates 140-1 to 140-19. One of the outputs Q00–Q09 of the address register 113 and the signal in which the selector control signal S is reversed by the inverter 142 are input to the ten even numbered ones of the AND gates 140-2 to 140-20. Outputs of the odd and even numbered AND gates are both input to the OR gates 141-1 to 141-10.

As shown in FIG. 1, the output An (A0–A9) of the read address setting circuit 110 is supplied to the FIFO memory 101.

In the FIFO memory 101, a second read address signal An is latched in synchronization with the memory read access signal CS and data Yn corresponding to the address from which An is read.

Next, an operation of reading data in a semiconductor memory device 100 shown in FIG. 1 is explained with reference to the timing chart of FIG. 6. Furthermore, FIG. 6 shows, for example, the N read cycle, in which data corresponding to the address N is read after read addresses sequentially updated from the leading address 0 are designated, and a cycle thereafter.

(N read cycle)

Figure 6:
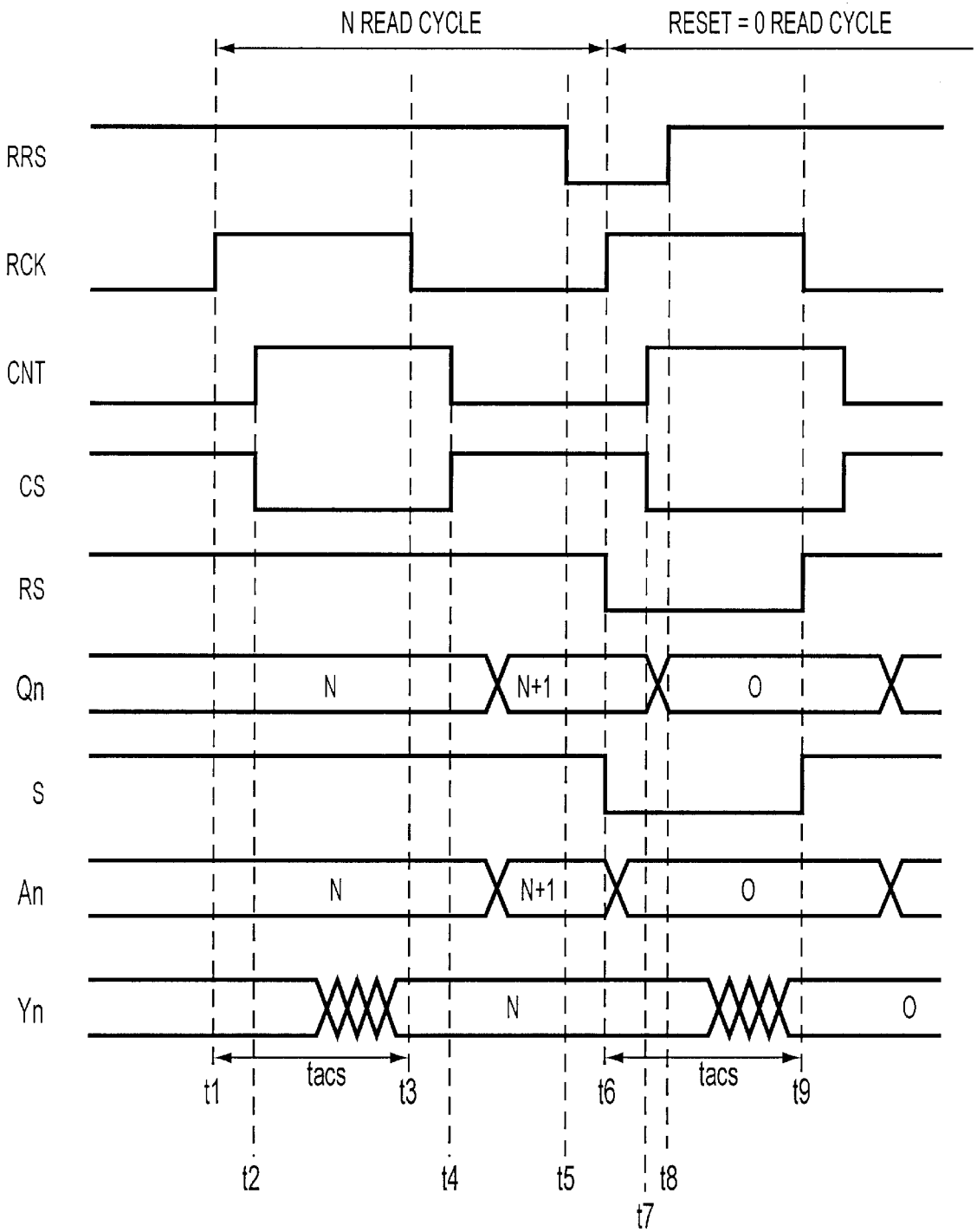
FIG. 6 is a timing chart of an operation of reading the semiconductor memory device shown in FIG. 1.

In FIG. 6, an external clock signal RCK rises at time t1 of an interval in which the reset signal RRS is inactive (HIGH). In synchronization with the rise of the external clock signal RCK, the memory read access signal CS falls at time t2, and the FIFO memory 101 enters a reading state.

At this time, the read counter 103 finishes counting up by the falling a half cycle before the rise of time t2 of the counter clock signal CNT. Therefore, at time t2, the counter output value Qn (the address value of the first read address signal) as shown in FIG. 6 holds "N".

Here, because the reset signal RRS is inactive (HIGH), the output Q of the D type flip flop 120 of the selector control circuit 111 shown in FIG. 2 is constantly HIGH. Therefore, the selector control signal S which is the output of the logic gate 121 shown in FIG. 2 also becomes HIGH. Because of this, the selector 112 of the read address setting circuit 110 selects and outputs the output values Q1–Q10 of the read counter 103 in accordance with the logical product of the AND gates 140-1 to 140-20 and the logical sum of the OR gates 141-1 to 141-9. Therefore, when the reset signal RRS is inactive, the second read address signal An (=Qn), which is the same as the logic of the output value of the read counter 103, is supplied to the FIFO memory 101.

The FIFO memory 101 latches the second read address signal An at the fall of the memory read access signal CS at time t2. At this time, at time t2, the value of the second read address signal An is stable at N. Therefore, the FIFO memory 101 performs the N read cycle which reads data Yn corresponding to the second read address signal An (address value N) which has been latched at time t2. Furthermore, the data Yn is read from the FIFO memory 101 after a specified access time interval tacs has elapsed since the starting time t1 of the N read cycle.

When the external clock signal RCK falls at time t3 after the data Yn has been read, the counter clock signal CNT falls at time t4, and the memory read access signal CS rises. By the rise of the memory read access signal CS, memory access is completed. Meanwhile, the read counter 103 counts up at the fall of the counter clock signal CNT, outputs the value N+1 as a first read address signal Qn, which is the output, and prepares for the following read cycle. At this time, because the reset signal RRS is inactive, the second read address signal An from the read address setting circuit 110 also changes to the value N+1, but this value is not yet latched by the FIFO memory 101.

After this, if the reset signal RRS does not become active and the external clock signal RCK rises, in the same manner as in the above-mentioned N read cycle, the value N+1 is latched by the FIFO memory 101, and the N+1 read cycle is performed.

(0 read cycle after reset)

FIG. 6 shows that after the external clock signal RCK falls at time t3, the reset signal RRS changes to active (LOW) at time t5 before the next rising time t6 of the external clock signal RCK.

In this case, the output Q of the D type flip flop 120 of FIG. 2 which structures the selector control circuit 111 of FIG. 1 changes to LOW as the external clock signal RCK rises at time t6. By so doing, the select control signal S, which is the output of the logic gate 121 of FIG. 2, changes from HIGH to LOW.

By so doing, in the selector 112, in accordance with the logical sum of the OR gates 141-1 to 141-9 and the logical product of the AND gates 140-1 to 140-20 of FIG. 5, the outputs Q00–Q09 of the address register 113 are selected and output. Because of this, all of the address values A1–A10 which structure the second read address signal An, which is the output of the read address setting circuit 110, becomes 0 regardless of the logic of the first read address signal Qn.

In other words, when the reset signal RRS becomes active, the second read address signal An from the read address setting circuit 110 changes to the outputs Q00–Q09 of the address register 113 in synchronization with the following rise of the external clock signal RCK afterward. Thus, the value of the second read address signal An can be forcibly set at 0.

When the external clock signal RCK rises at time t6, in synchronization with this, the memory read access signal CS falls at time t7. At the fall of the memory read access signal CS at time t7, the FIFO memory 101 latches the second read address signal An.

At this time, because the second read address signal An is already set at 0 at time t6, the FIFO memory 101 can implement the 0 read cycle, which reads data 0 corresponding to the address value 0.

Thus, according to the first embodiment, when the reset signal RRS becomes active (time t5), in synchronization with the following rising of the read clock signal RCK (time t6), the second read address signal An can be instantly changed to the 0 address. Therefore, when the second read address signal An is latched (time t7) in the FIFO memory 101, regardless of the logic status of the first read address signal Qn from the read counter 103, the 0 address can be latched. Furthermore, the interval between times t6 and t7 can be secured as an address setup time in the FIFO memory 101, and address latch timing is not necessarily delayed, as in a conventional device, so the access time interval can be shortened.

After this, when the reset signal RRS becomes inactive (HIGH) at time t8, the select control signal S rises at the fall of the clock signal RCK (time t9). By so doing, the selector 112 returns to a normal operation which selects the first read address signal Qn from the read counter 103.

Second Embodiment

Figure 7:
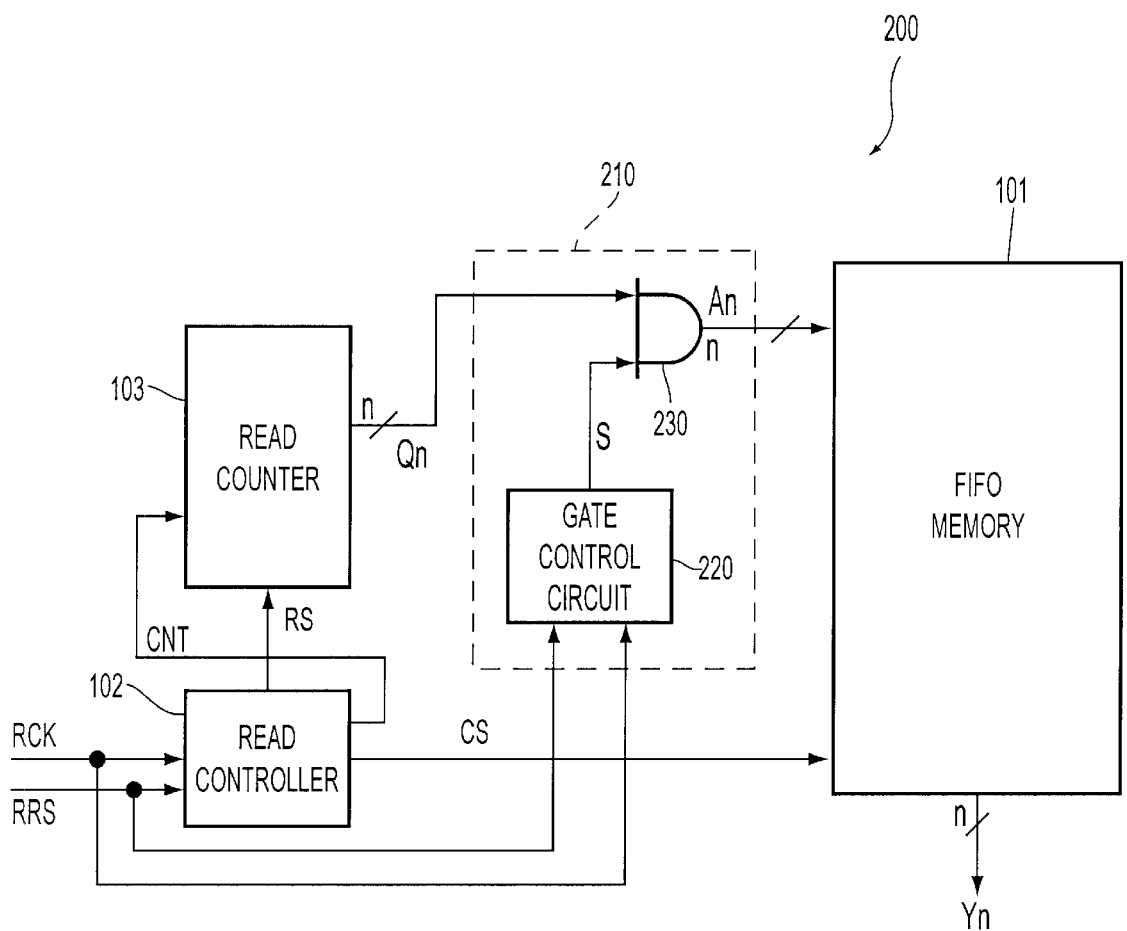
FIG. 7 is a block diagram of a semiconductor memory device related to a second embodiment of this invention.

A semiconductor memory device related to the second embodiment is shown in FIG. 7. In the semiconductor memory device 200, as shown in FIG. 7, the read address setting circuit 110 of the semiconductor memory device 100 shown in FIG. 1 is changed to a read address setting circuit 210.

The read address setting circuit 210 shown in FIG. 7 has a gate control circuit 220 and a logic gate group, for example, an AND gate group 230 controlled by the gate control circuit, but does not have the address register 113 shown in FIG. 1. The gate control circuit 220 has the same structure as the selector control circuit 111 shown in FIG. 2, and the logic of the gate control signal S is the same as the logic of the selector control signal S.

Figure 8:
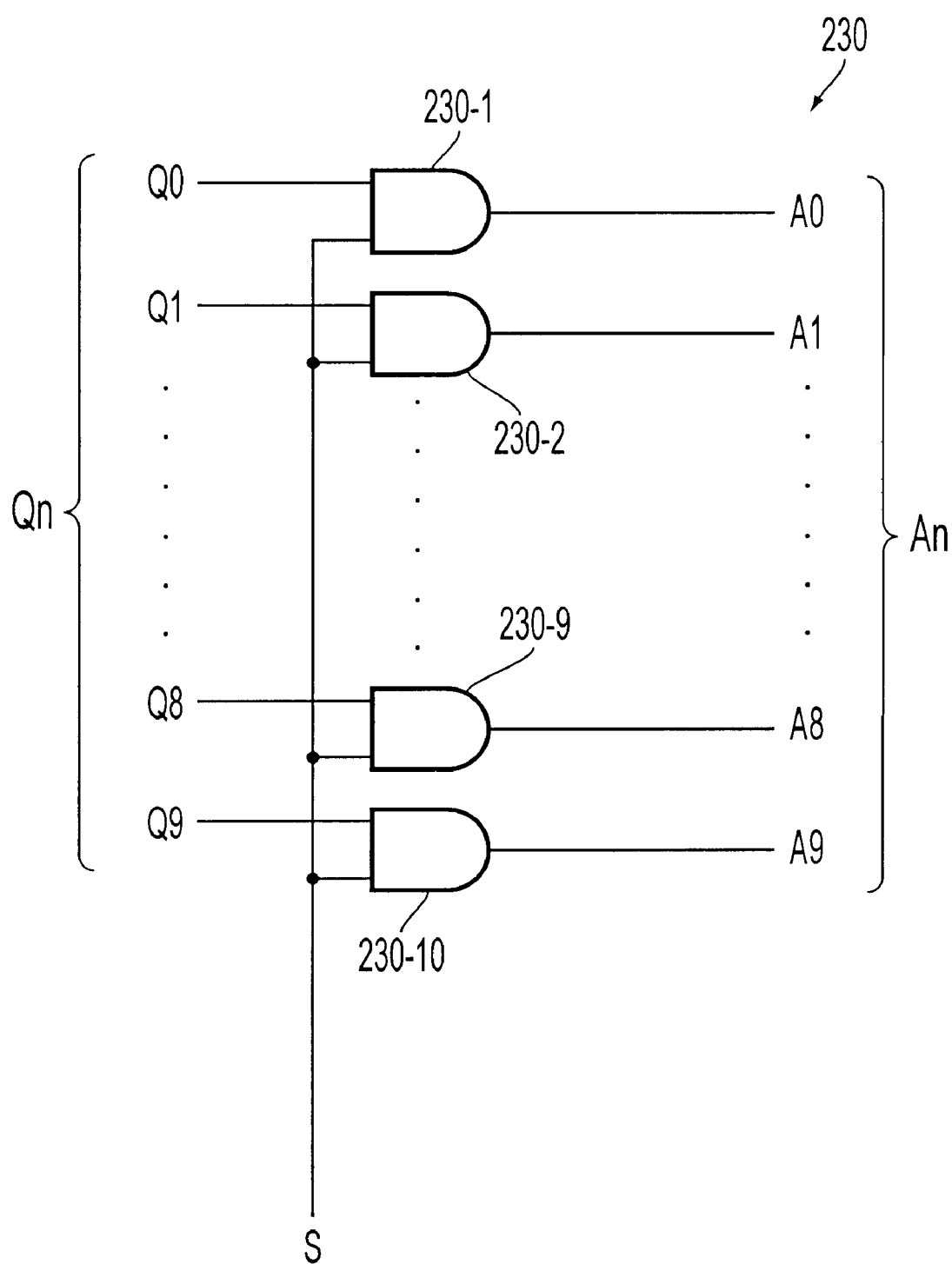
FIG. 8 is a circuit diagram of the AND gate group shown in FIG. 7.

The AND gate group 230 shown in FIG. 7 is constituted by ten AND gates 230-1 to 230-10, as shown in FIG. 8. One of the outputs Q1–Q10 from the read counter 103 and the gate control signal S are input to each AND gate 230-1 to 230-10. The output An (A1–A10) of the AND gates 230-1 to 230-10 is supplied to the FIFO memory 101.

The operation of the semiconductor memory device 200 related to the second embodiment is substantially the same as the operation shown in the timing chart of FIG. 6 of the semiconductor memory device of FIG. 1 related to the first embodiment.

That is, because the gate control signal S is HIGH in the N read cycle, in which the reset signal RRS is inactive (HIGH), the output Qn from the read counter 103 can be obtained as-is as the output An of the AND gates 230-1 to 230-10 shown in FIG. 8.

Meanwhile, in the 0 read cycle, the gate control circuit 220 generates a gate control signal S, which is the same output of the selector control circuit 111 related to the first embodiment as shown in the circuit of FIG. 2, and changes from HIGH to LOW at time t6 of FIG. 6.

Therefore, also in the semiconductor memory device 200 related to the second embodiment, as shown in FIG. 6, when the reset signal RRS becomes active (time t5), the second read address signal An can be instantly changed to the 0 address in synchronization with the following rise of the read clock signal RCK (time t6). Therefore, at the latch time of the second read address signal An (time t7) in the FIFO memory 101, regardless of the logic status of the first read address signal Qn from the read counter 103, the 0 address can be latched.

Here, in the second embodiment, without using the address register 113 as in the first embodiment, the 0 address can be set in the AND gate group 230. That is, as the gate control signal S which is input to the AND gates 230-1 to 230-10. shown in FIG. 8 becomes LOW (=0), the second read address signal An, which is the output of the AND gates 230-1 to 230-10, becomes A0 =A1 =. . . A9 =0. Thus, according to the second embodiment, the 0 address can be set based on the logic of the gate control signal S.

In this second embodiment, there is an effect such that the access time interval tacs can be shortened, compared to the first embodiment. This is because the selector 112 of the first embodiment needs a first row of the AND gate group and a second row of the OR gate group, as shown in FIG. 5, while merely a first row of the AND gate group 230 is sufficient in FIG. 8. In FIG. 8, because a second row of the logic gate group is not needed, the signal delay becomes less, so the access time interval tacs can be shortened.

Third Embodiment

Figure 9:
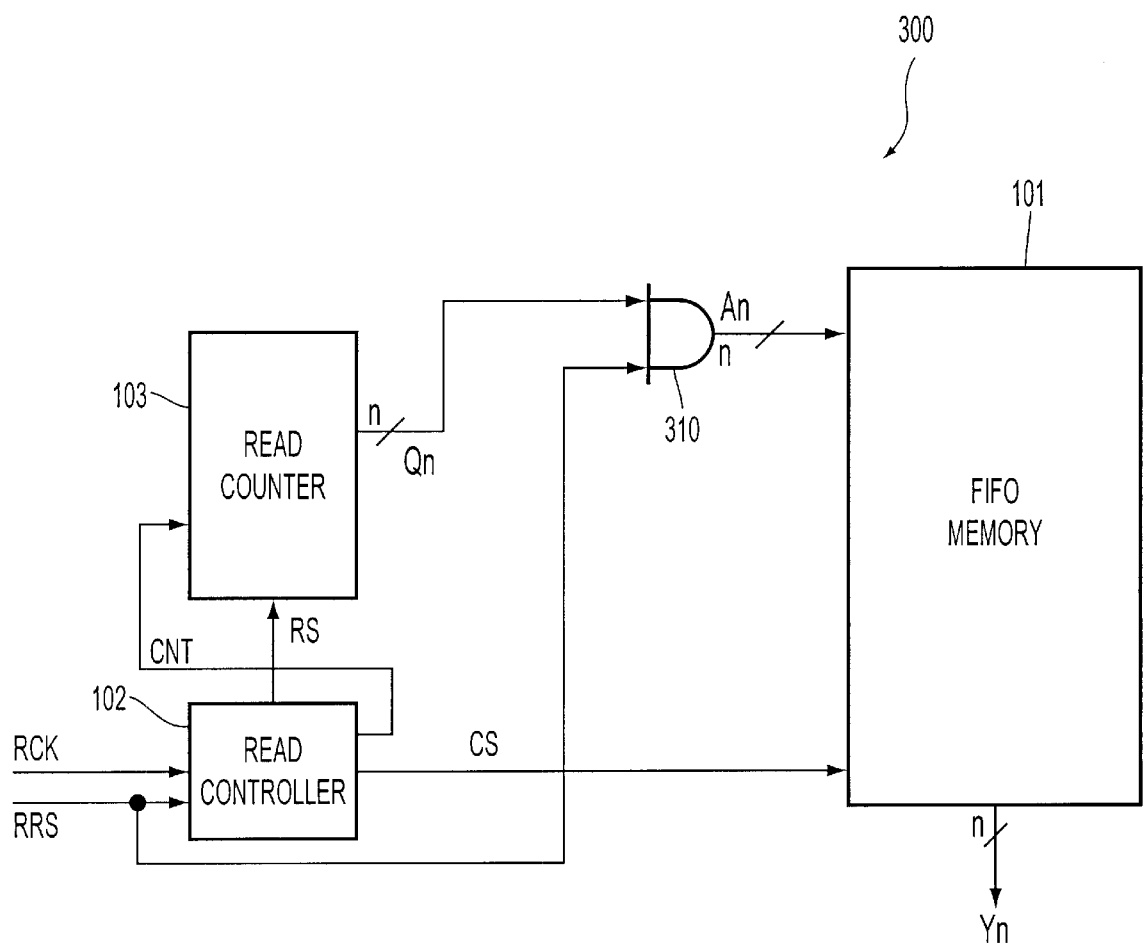
FIG. 9 is a block diagram of a semiconductor memory device related to a third embodiment of this invention.

FIG. 9 shows a semiconductor memory device 300 related to the third embodiment of this invention. The differences between the semiconductor memory device 300 shown in FIG. 9 and the semiconductor memory device 200 shown in FIG. 7 are that the read address setting circuit 310 is constituted by an AND gate group only, the reset signal RRS is directly input to one of the input terminals of the AND gate group, and the gate control circuit 220 shown in FIG. 7 is omitted.

In the first and second embodiments, the timing at which the second read address signal An is changed to address 0 was synchronized with the external clock signal RCK. In contrast, in the third embodiment, the second read address signal An is changed to address0 depending on the reset signal RSS only, without synchronization with the external clock signal RCK.

Figure 10:
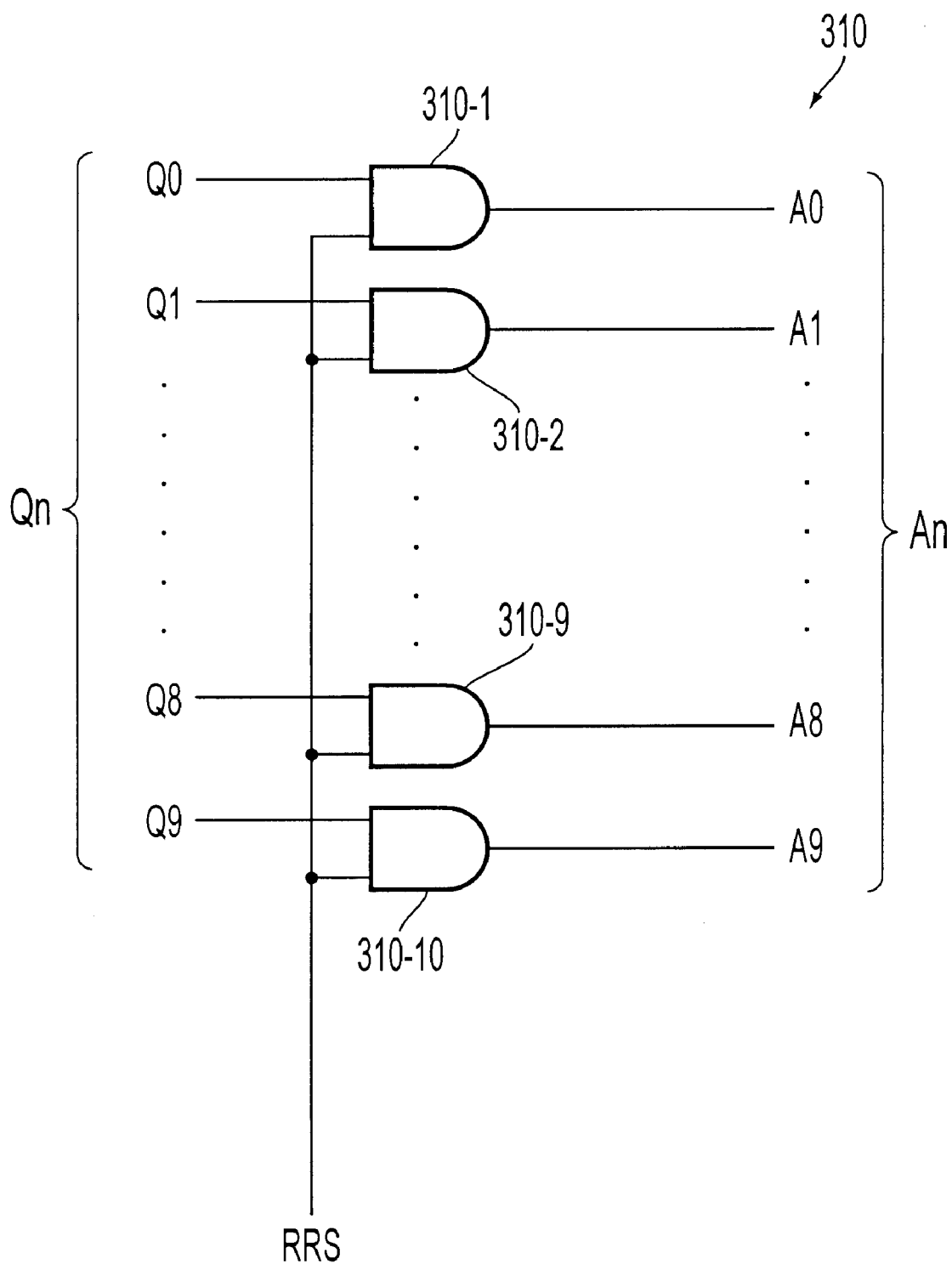
FIG. 10 is a circuit diagram of an AND gate group which structures the read address setting circuit shown in FIG. 9.

The read address setting circuit 310 shown in FIG. 9 is similar to the structure of FIG. 8 because it is structured by ten AND gates 310-1 to 310-10, as shown in FIG. 10. However, there is a difference such that, the gate control signal S is not, as shown in FIG. 8, commonly input to the AND gates 310-1 to 310-10 shown in FIG. 10, but the reset signal RRS is commonly input.

Figure 11:
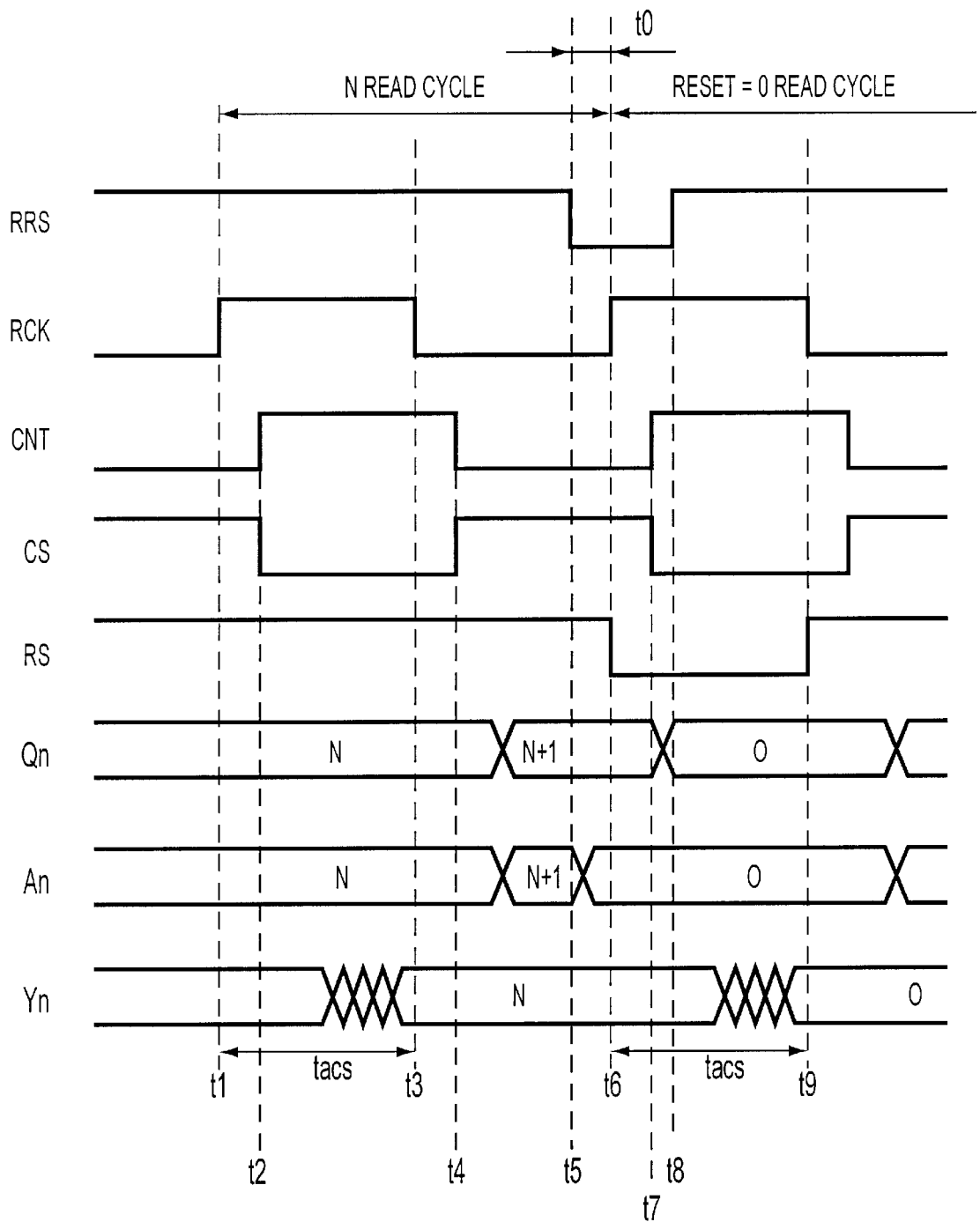
FIG. 11 is a timing chart of a reading operation of the semiconductor memory device shown in FIG. 9.

An operational timing chart of a semiconductor memory device related to this third embodiment is shown in FIG. 11. As clarified from the comparison between FIGS. 6 and 11, in the third embodiment, the N read cycle is performed in the same manner as in the first and second embodiments, but the operation after the reset signal RRS becomes active (LOW) is different.

Also, in FIG. 11, the external clock signal RCK falls at time t3, and the reset signal RRS changes to active (LOW) at time t5 before the following rising time t6.

In this case, one input of each of the AND gates 310-1 to 310-10 of FIG. 10 forming the read address setting circuit 310 of FIG. 9 is changed to LOW. Therefore, all the address values A1–A10 forming the second read address signal An, which is the output of the AND gates 310-1 to 310-10, immediately becomes 0 regardless of the logic of the first read address signal Qn.

In other words, immediately after the reset signal RRS becomes active (LOW), without synchronization with the external clock signal RCK, the logic of the second read address signal An from the read address setting circuit 310 immediately changes to the logic of the reset signal RRS (LOW). Thus, the value of the second read address signal An can be forcibly set at0.

When the external clock signal RCK rises at time t6 after this time t5, in synchronization with this, the memory read access signal CS falls at time t7. At the fall of the memory read access signal CS at this time t7, the FIFO memory 101 latches the second read address signal An.

At this time, because the second read address signal An is already set at 0 at time t5, the FIFO memory 101 can implement the 0 read cycle which reads data 0 corresponding to the address value0.

Furthermore, even if the second read address signal An is changed to address 0 without synchronization with the external clock signal RCK, the latch timing of the address 0 is implemented, based on the memory read access signal CS. This memory read access signal CS is generated in synchronization with the external read clock signal RCK in the read controller 102. Therefore, there is no doubt that the read operation in the FIFO memory 101 is performed in synchronization with the external clock signal RCK.

If the timing chart of FIG. 11 is compared to FIG. 6, the time at which the value of the second read address signal An is changed from "N+1" to "0" is faster in FIG. 11. That is, FIG. 11 shows that this time is synchronized with the time t5 at which the reset signal RRS becomes active (LOW), but in contrast, FIG. 6 shows that this time is synchronized with the rise (time t6) of the external clock signal RCK.

Usually, in the reset operation of the FIFO memory 101, a specification of a setup time (time t0 of FIG. 11) for the rise of the external clock signal RCK exists. In the semiconductor memory device 300 related to the third embodiment, compared to the semiconductor memory devices 100, 200 related to the first and second embodiments, the read address setup time can be further secured by the above-mentioned setup time interval t0. As a result, the 0 read cycle can be more securely implemented during reset.

Fourth Embodiment

Figure 12:
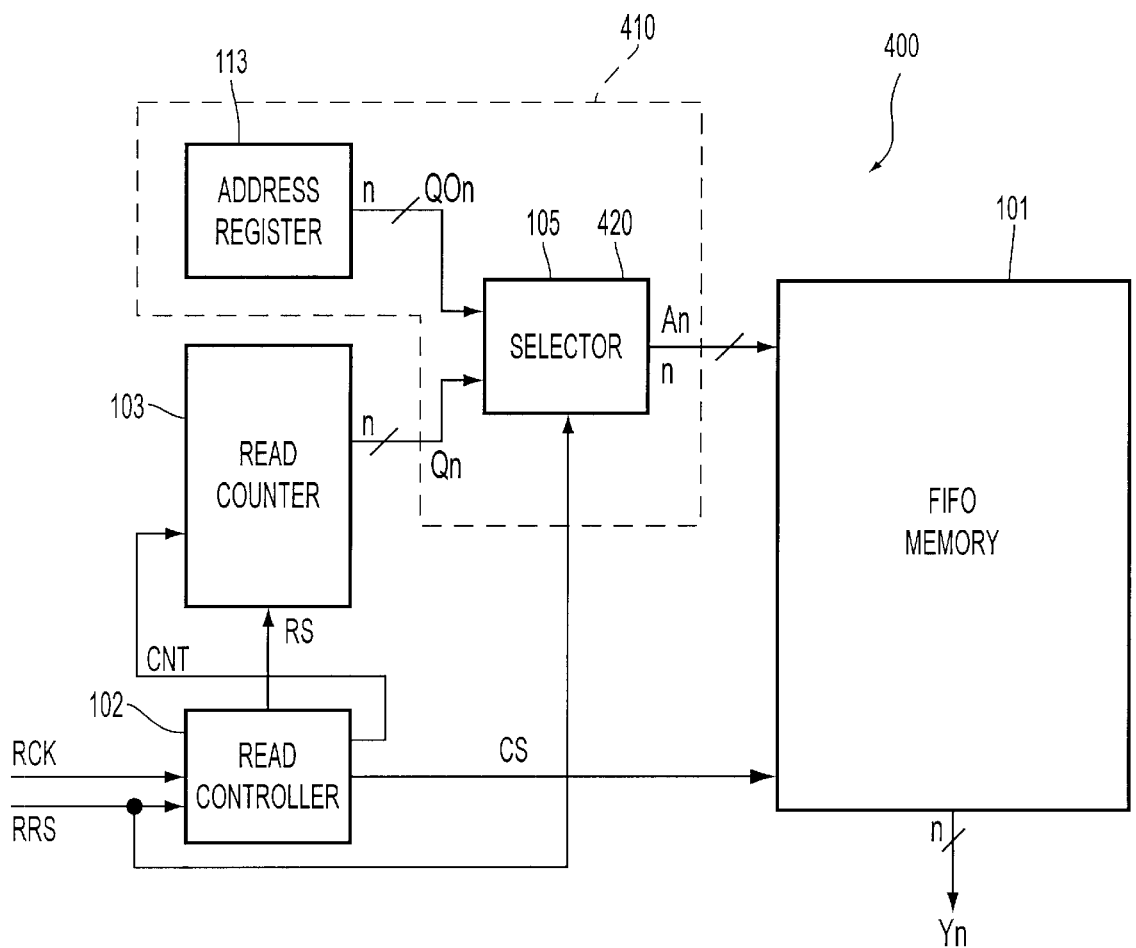
FIG. 12 is a block diagram of a semiconductor memory device related to a fourth embodiment of this invention.

FIG. 12 shows a semiconductor memory device 400 related to the fourth embodiment. The difference between the semiconductor memory device 400 related to the fourth embodiment and the semiconductor memory devices in other embodiments is that a read address setting circuit 410 is used instead of the address setting circuit 310 shown in FIG. 9.

Figure 13:
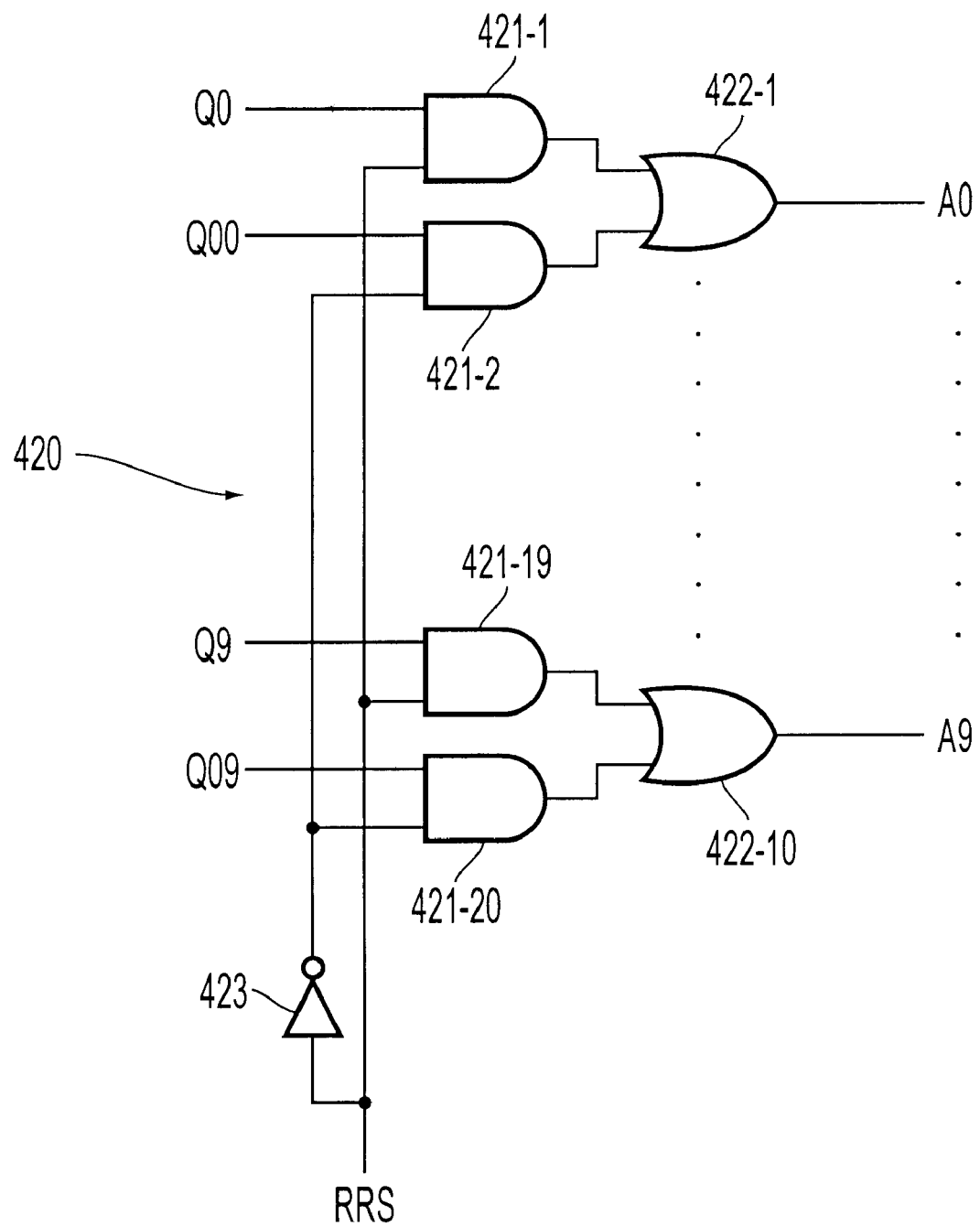
FIG. 13 is a circuit diagram of the selector shown in FIG. 12.

This read address setting circuit 410 has an address register 113 shown in FIG. 3 or FIG. 4 and a selector 420. One example of the selector 420 is shown in FIG. 13. As shown in FIG. 13, the selector 420 has a first row of twenty AND gates 421-1 to 421-10 and a second row of ten OR gates 422-1 to 422-10.

One of the outputs Q0–Q9 of the read counter 103 and the reset control signal RRS are input to the odd numbered ones of the AND gates 421-1 to 421-19. One of the outputs Q00–Q09 of the address register 113 and the signal in which the reset control signal RRS has been reversed by the inverter 423 are input to the even numbered ones of AND gates 421-2 to 421-20. The outputs of the even and odd numbered AND gates are input to the OR gates 422-1 to 422-10.

The operation of the semiconductor memory device 400 related to this fourth embodiment is substantially the same as in FIG. 11, which shows the operation timing chart of the semiconductor memory device 300 related to the third embodiment.

That is, in the fourth embodiment as well, in the same manner as in the third embodiment, without synchronizing with the external clock signal RCK, and depending on the reset signal RSS only, the second read address signal An can be changed to the address 0. This is because the external clock signal RCK is not input to the selector 410, and switch control is done by the reset signal RSS only.

The semiconductor memory device 400 shown in FIG. 12 is different from the semiconductor memory device 300 shown in FIG. 9 in that the setting of the 0 address depends merely on the output from the address register 113. The other operational principles are the same as in the semiconductor memory device 300 shown in FIG. 9.

However, the selector 420 shown in FIG. 12 is constituted by two rows of logic gates as shown in FIG. 13. Compared to the case in which the selector is constituted by one row of logic gates only, as shown in FIG. 10, the delay amount of the address signal becomes large.

Furthermore, this invention is not limited to the above-mentioned embodiments, but can be modified within the scope of this invention.

Figure 14:
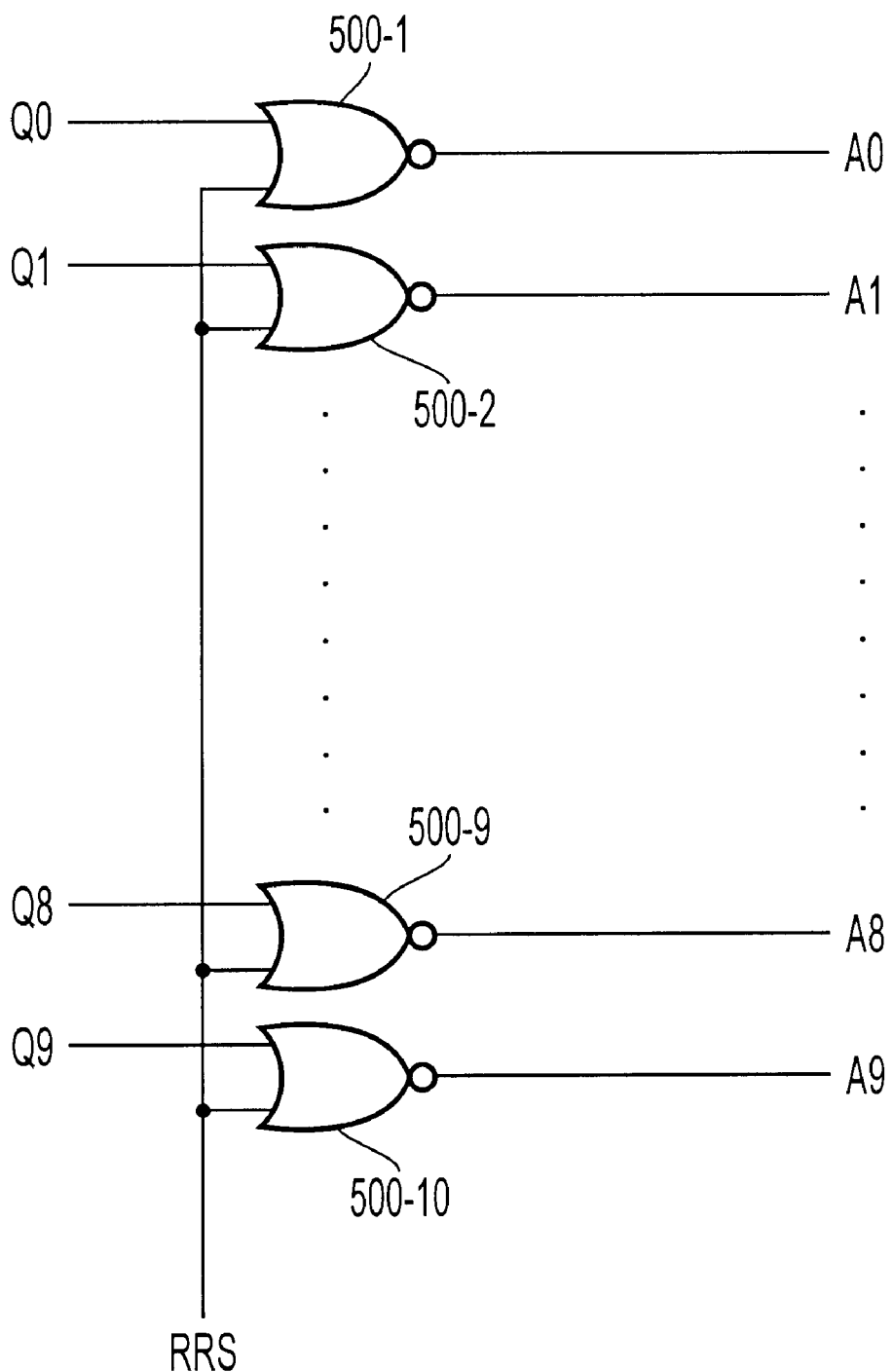
FIG. 14 is a circuit diagram showing a modification of FIGS. 8 and 10 when a reset signal and a gate controlling signal are made HIGH active.
Figure 15:
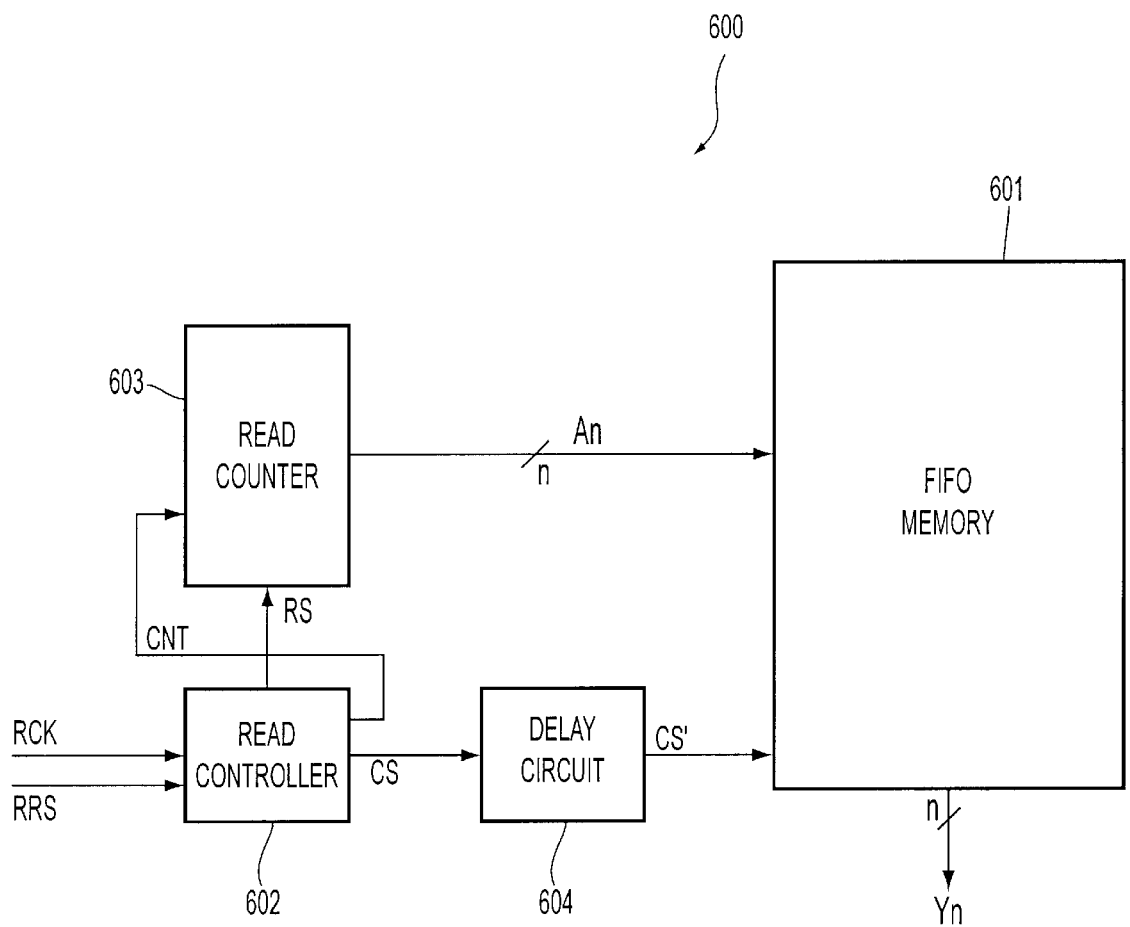
FIG. 15 is a block diagram of a conventional clock-synchronized type semiconductor memory device.
Figure 16:
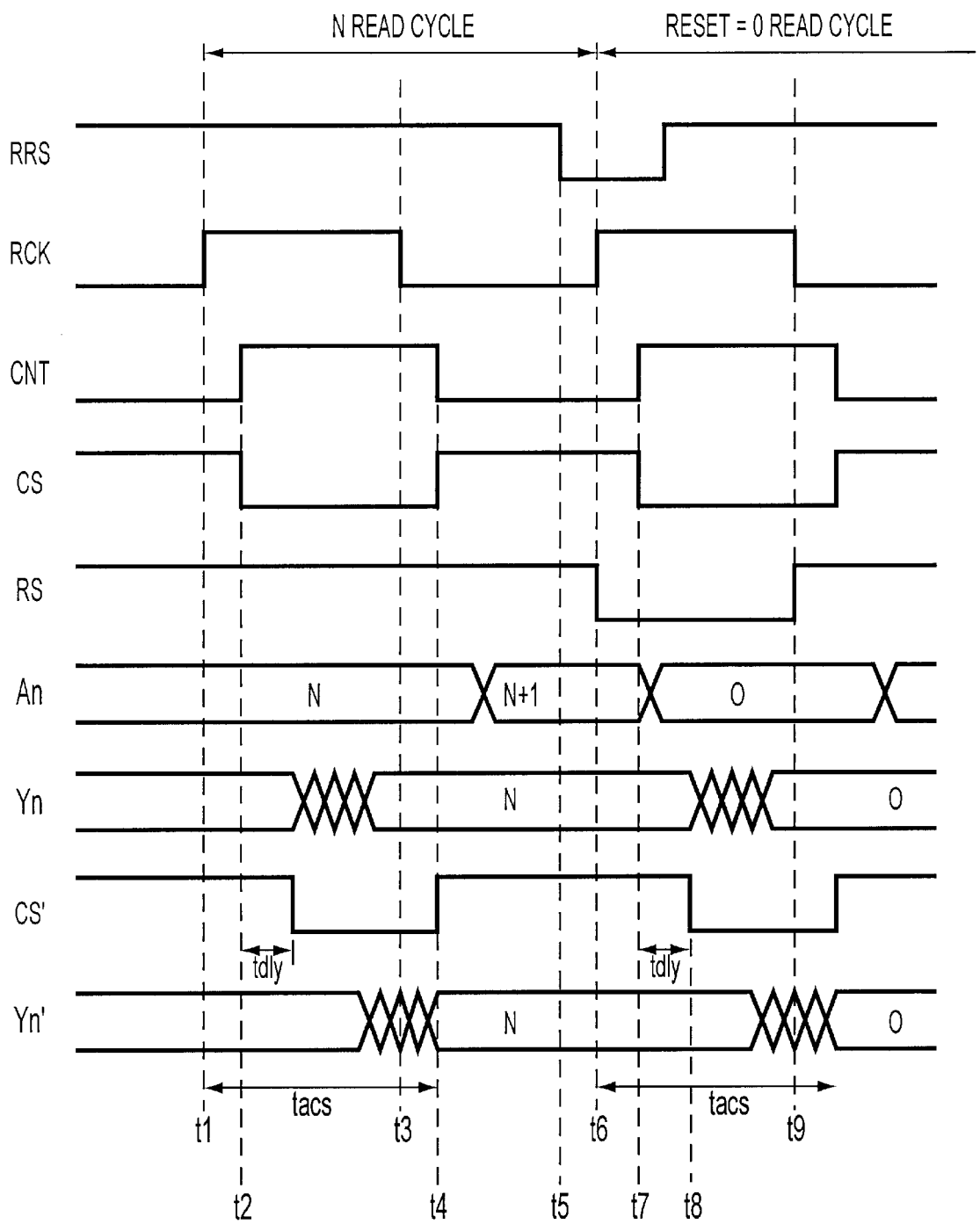
FIG. 16 is a timing chart of a reading operation of the semiconductor memory device shown in FIG. 15.

For example, the logic gates shown in FIGS. 8 and 10 are an example of the case in which the gate control signals and the reset signal RSS are LOW active, but the gates can be changed to NOR gates 500-1 to 500-1, as shown in FIG. 14 for HIGH active. This is excellent, compared to the AND gates, because the signal delay can be less.

Furthermore, in order to set the address 0, if the logic of the selector control signal S, the gate control signal S or the reset signal RRS is used, this is excellent because the address register 113 can be omitted. Meanwhile, in the case of using the address register 113, a specified address after reset can be set at an arbitrary address value including address 0. For example, if a number of inverters which are connected to the output lines of the outputs Q0–Q9 in FIGS. 3 and 4 can be independently set, the address value can be arbitrarily set.

Furthermore, a specified address value of the address register can be a programmable register so that an end user can arbitrarily change the value.

Additionally, as a memory to which this invention is applied, this is not limited to a FIFO memory. The invention can be used with various memories which are of a clock-synchronized type and which read the address value as the address value is updated by the read counter and returns to a specified address after reset.

What is claimed is:

1. A semiconductor memory device comprising:

a memory storing data read out from the memory in synchronization with a read clock signal;

a read controller which synchronizes with the read clock signal, generates a read counter clock signal and a memory read access signal, and generates a read counter reset signal which is activated in synchronization with the read clock signal after a reset signal becomes active;

a read counter which sequentially generates first read address signals with different address values in synchronization with the read clock signal and which is reset when the read counter reset signal is active; and a read address setting circuit which outputs second read address signals to the memory, based on at least the first read address signals from the read counter and the reset signal, address values of the second read address signals from the read address setting circuit being set based on address values of the first read address signals when the reset signal is inactive, and being set at a specified address value regardless of a logic of the first read address signals when the reset signal is active.

2. The semiconductor memory device as set forth in claim 1, when the reset signal is active, the read address setting circuit changing the address values of the second read address signals to specified address values in asynchronization with the read clock signal.

3. The semiconductor memory device as set forth in claim 2, the read address setting circuit setting the specified address values of the second read address signals based on a logic of the reset signal when the reset signal is active.

4. The semiconductor memory device as set forth in claim 3, the read counter having n output lines, and the read address setting circuit being structured by n logic gates, to which a signal from one of the n output lines and the reset signal are respectively input.

5. The semiconductor memory device as set forth in claim 3, the read address setting circuit setting a 0 address as specified address values of the second read address signals when the reset signal is active.

6. The semiconductor memory device as set forth in claim 5, the reset signal being LOW active and the n logic gates being AND gates.

7. The semiconductor memory device as set forth in claim 5, the reset signal being HIGH active and the n logic gates being NOR gates.

8. The semiconductor memory device as set forth in claim 1, the read address setting circuit having:

an address register which stores the specified address values; and a selector which selects one of the specified address values from the address register and the first read address signals from the read address counter and outputs the selected one as a second read address signal, based on the reset signal.

9. The semiconductor memory device as set forth in claim 1, the read address setting circuit changing the address values of the second read address signals to specified address values in synchronization with the read clock signal when the reset signal is active.

10. The semiconductor memory device as set forth in claim 9, the read counter having n output lines, and the read address setting circuit having:

a gate control circuit which generates a gate control signal, based on the read clock signal and the reset signal; and n logic gates to which signal from one of the n output lines and an output signal from the gate control circuit are respectively input.

11. The semiconductor memory device as set forth in claim 9, the read address setting circuit having:

an address register which stores the specified address values;

a selector control circuit which generates a selector control signal, based on the read clock signal and the reset signal; and a selector which selects one of the specified address values from the address register and the first read address signals from the read address counter, based on the selector control signal, and outputs the one as a second read address signal.

12. The semiconductor memory device as set forth in claim 8, the read address setting circuit setting a 0 address as the specified address values of the second read address signals when the reset signal is active.

13. The semiconductor memory device as set forth in claim 8, the address register arbitrarily setting the specified address values.

* * * * *